United States Patent [19]

Ogiro et al.

[11] 4,419,708
[45] Dec. 6, 1983

[54] MAGNETIC RECORDING TAPE CARTRIDGE

[75] Inventors: Kenji Ogiro; Masayuki Fujisaki, both of Yokohama; Shinichi Gotoh, Kyoto, all of Japan

[73] Assignee: Hitachi Maxell, Ltd., Osaka, Japan

[21] Appl. No.: 287,555

[22] Filed: Jul. 28, 1981

[30] Foreign Application Priority Data

Jul. 28, 1980 [JP] Japan ............................. 55-105602

[51] Int. Cl.³ ............................................ G11B 23/04
[52] U.S. Cl. ...................................... 360/132; 242/197
[58] Field of Search .................. 360/132; 242/194, 197

[56] References Cited

U.S. PATENT DOCUMENTS

| | | | |
|---|---|---|---|
| 3,836,096 | 9/1974 | Fukushima et al. | 360/132 |
| 4,173,319 | 11/1979 | Umeda | 360/132 |
| 4,235,395 | 11/1980 | Wardenaar et al. | 360/132 |
| 4,254,922 | 3/1981 | Wolf et al. | 360/132 |
| 4,285,020 | 8/1981 | Sato | 360/132 |

*Primary Examiner*—Robert S. Tupper
*Attorney, Agent, or Firm*—Birch, Stewart, Kolasch and Birch

[57] ABSTRACT

A magnetic recording tape cartridge having means for placing the cartridge in a standard position of a tape player by means of at least one standard pin provided in the tape player, said cartridge comprising a pair of through-holes defined in the bottom part of the cartridge case with a diameter fairly larger than the diameter of the standard pin and a positioning means comprising a movable member biassed to oppose the through-hole by means of a resilient member so that when the standard pin is inserted into the through-hole the standard pin is clamped by the movable member and the inner wall of the hole to secure the cartridge in the standard position.

4 Claims, 40 Drawing Figures

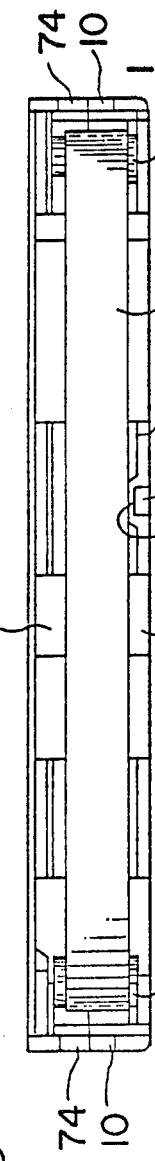
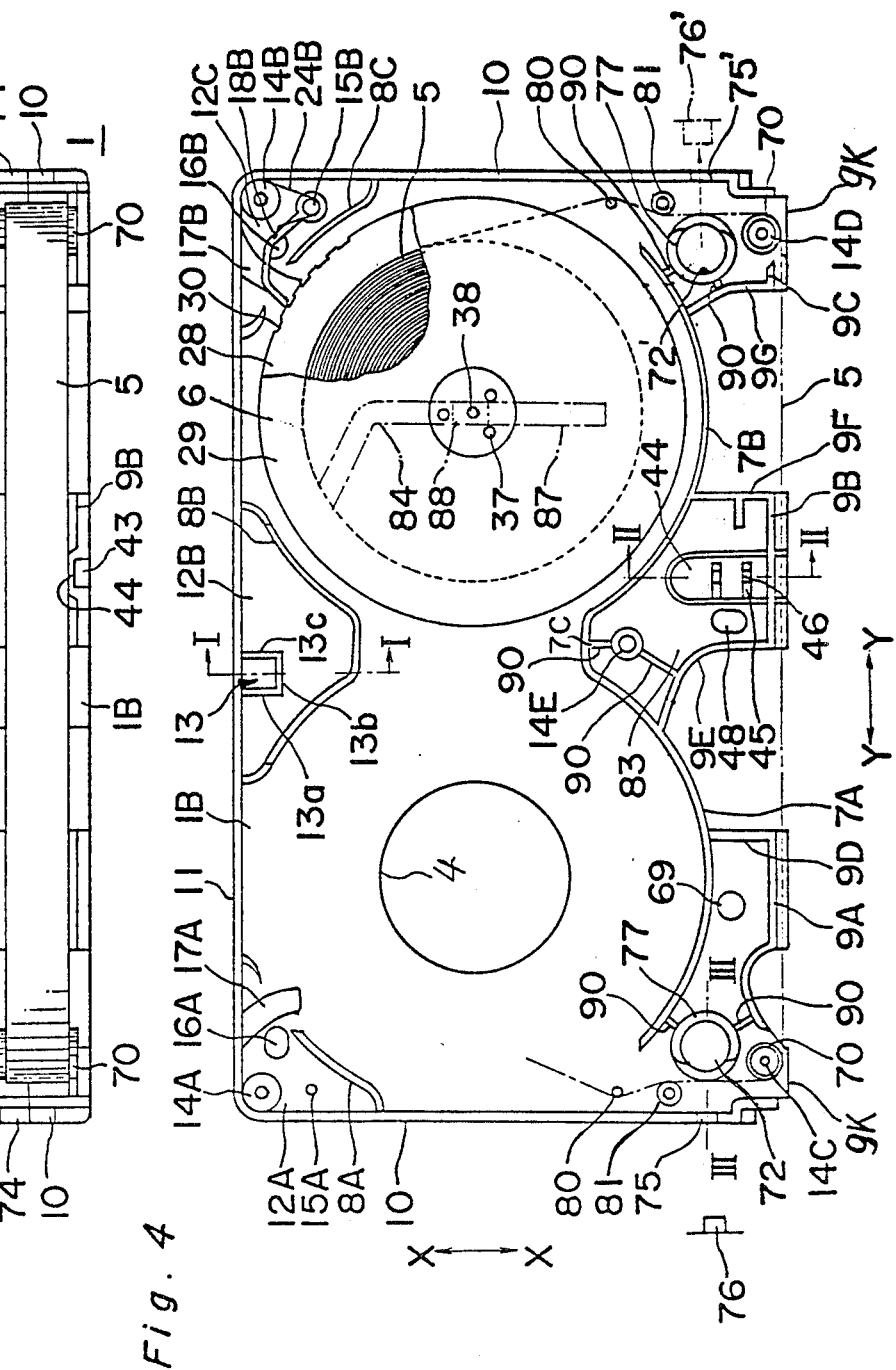
Fig. 3
Fig. 4

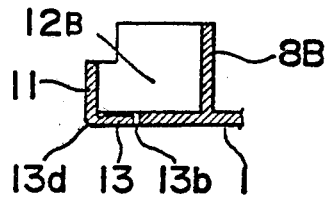
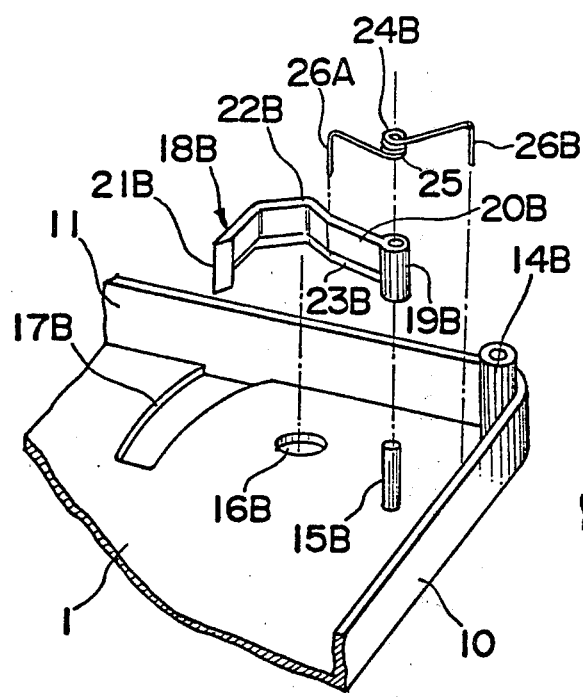
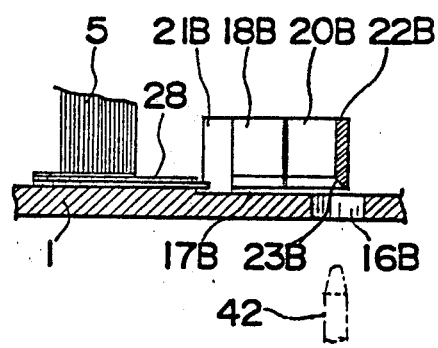
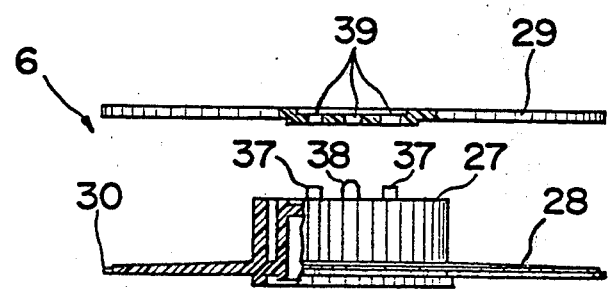
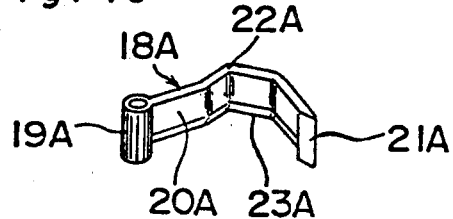

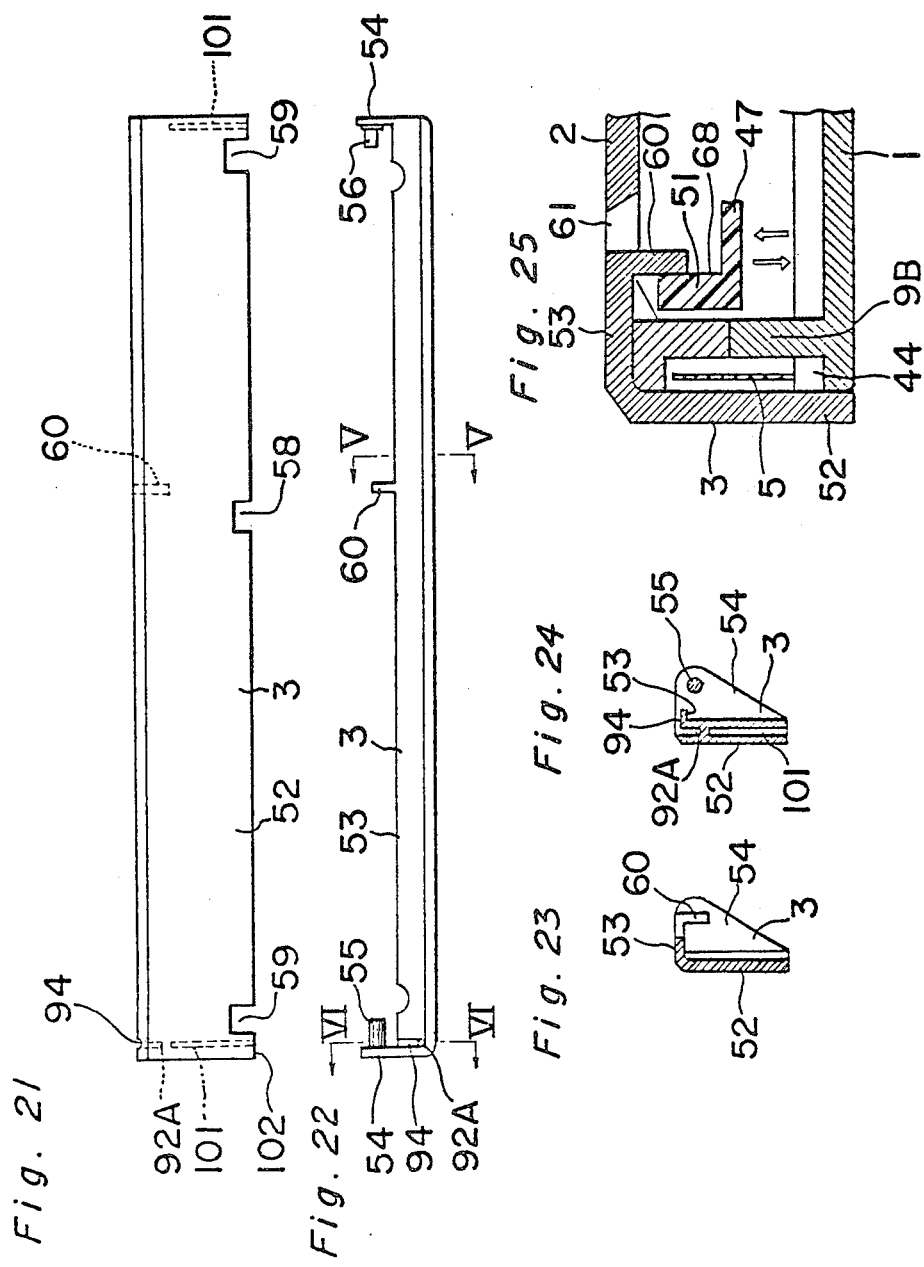

MAGNETIC RECORDING TAPE CARTRIDGE

FIELD OF THE INVENTION

The present invention relates to a magnetic recording tape cartridge, and in particular, it relates to a magnetic recording tape cartridge provided with a locking mechanism for locking rotation of at least one tape reel on which a magnetic recording tape is wound and a rotatable lid member for closing a front face of the cartridge to protect the magnetic recording tape extending along the front face.

BACKGROUND OF THE INVENTION

Such a magnetic recording tape cartridge is known as a video tape cartridge for use in recording and/or reproducing video signals in a magnetic recording tape, and such video tape cartridges comprise a pair of reels for winding the recording tape, said reels being driven by driving shafts of a recording/reproducing apparatus, a tape reel locking mechanism for preventing rotation of the reels to keep the intermediate portion of the recording tape extending along the front face of the cartridge stretched when the cartridge is not used and a rotatable lid member mounted on the front side of the cartridge to close the front face thereof to protect the intermediate portion of the recording tape existing along the front face. Furthermore, the recording tape cartridges are provided with a mechanism for releasing the reel locking mechanism when it is used and a mechanism either for locking the lid member in the closed position or for releasing the lid member and to open the front face of the cartridge when used.

Conventional video tape cartridges, however, have such various drawbacks as hereinafter explained which are remarkably recognized in view of decreasing the size of the cartridge.

In order to fix and precisely position the cartridge case on a predetermined position of a video tape player, there is provided a positioning device in the respective cartridge cases. One example of the positioning device in the known video tape cartridge has a pair of openings in the lower portion of the lid member with the respective portions of the front wall of the cartridge case exposed from the openings so as to allow engagement with the positioning member projected in the bottom wall of a cartridge holder of the video tape player. In addition, there are provided a pair of holes for allowing insertion of standard pins of the tape player in the bottom plate of the cartridge. When the cartridge is mounted on the video tape player, the cartridge case is inserted in the holes with the front wall portions exposed from the opening of the lid member abutted onto the positioning members to roughly determine the position. In turn, the cartridge case is pushed to be lowered with the standard pins inserted within the corresponding holes, thereby the cartridge case being fix precisely in position.

In known video tape cartridges, however, in order to assure precise positioning onto the tape player, the hole for receiving the standard pin has such a diameter as the standard pin tightly engaged in the hole. Therefore, when the hole is slightly displaced from the standard pin during mounting of the cartridge, the standard pin pushes the bottom case thereby causing deformation of the standard pin. This problem becomes magnified in the case where the cartridge case is reduced in size. Furthermore, since enough clearance between the hole and the standard pin is not allowed, high accuracy in molding of the cartridge is required. These problems become magnified when the size of the cartridge is reduced.

SUMMARY OF THE INVENTION

Accordingly an essential object of the present invention is to provide a magnetic recording tape cartridge capable of being easily mounted on a desired position of a tape player.

Another object of the present invention is to provide a magnetic recording tape cartridge being capable of easily manufactured with a relatively large clearance between the receiving hole and the standard pin.

A further object of the present invention is to provide a magnetic recording tape cartridge suitable for a video tape cartridge of a small size.

According to one aspect of the present invention, there is provided a magnetic recording tape cartridge comprising a bottom section and a top section assembled together by a fastening means so as to provide a cartridge case having a front wall, a bottom wall and a tape chamber with a plurality of openings formed in said front wall, at least one tape reel accommodated in said tape chamber, rotatably mounted relative to a drive shaft insertion hole defined in the bottom wall of the bottom section of the cartridge case, a magnetic recording tape wound around said reel, the intermediate portion of said recording tape being stretched along a predetermined path defined by said front wall, a lid member hingedly mounted on the cartridge case and having a generally straight lid plate disposed generally parallel with the front wall to close the openings of the front wall to protect the magnetic recording tape situated along the front wall, the lid member being rotated in a direction away from the front wall when used, the lid plate being provided with a pair of openings at the lower end portion in both of the lateral end portions of the cartridge case so as to expose the corresponding portions of the front wall of the cartridge case for abutting onto a pair of positioning members provided in a cartridge mounting holder of a tape player, a pair of through-holes defined in the bottom wall of the bottom section for receiving a standard pin of the tape player with the diameter of the hole being larger than the diameter of the standard pin to loosely receive the standard pin in the hole, and means for positioning the cartridge case on a predetermined position of the tape player, having a movable member resiliently biassed by means of a resilient member to oppose the hole from above so as to resiliently engage with the standard pin inserted inside the cartridge case through the hole when the cartridge case is mounted on the tape player thereby clamping the standard pin between the movable member and a portion of the wall of the hole to cause the cartridge case to be detouchably secured in position.

According to the present invention, a pair of standard pin insertion holes are formed in the bottom surface of the cartridge case, whose inner diameters are sufficiently larger than the outer diameter of the standard pin of a tape player, and an elastic pressing member is provided in the portion corresponding to the standard pin insertion hole to press the standard pin so that the standard pin is in contact with the peripheral edge of the through-hole. Thus, smooth and easy insertion of the standard pin and accurate fixing of the cartridge after insertion of the standard pin, which have been difficult to locate by the standard pin in the conventional magnetic recording tape cartridge, can be satisfactorily conducted, and therefore correct location of the cartridge case can be expectd even if the cartridge case is not precisely located on the standard position of a tape player at the time of insertion of the standard pin. Namely, the present invention enables insertion of the standard pin even in a case where the cartridge is slightly inclined during insertion of the standard pin, and therefore the standard pin insertion hole can be provided in the portion rearward of the cartridge which is greatly influenced by inclination of the cartridge.

Further, in diminishing the size of the magnetic recording tape cartridge, the space between the standard pin and a positioning projection provided in a tape player can be enlarged and the cartridge case can be securely and accurately fixed in a tape player, thereby maintaining an appropriate relationship between the positions of the magnetic recording tape and the magnetic head of a tape player and improving the recording/reproducing characteristic of the magnetic recording tape cartridge.

BRIEF EXPLANATION OF THE DRAWINGS

FIG. 3 is a front elevational view of the magnetic recording tape cartridge of the present invention with the rotatable lid member being removed;

FIG. 4 is a top plan view of a bottom section of the magnetic recording tape cartridge with one of the reels being mounted;

FIG. 7 is a cross sectional view taken along the line I—I in FIG. 4;

FIG. 8 is an exploded perspective view of the member for preventing rotation of the reels;

FIG. 9 is a partial cross sectional view of the member of FIG. 8;

FIG. 10 is a perspective view of the member for preventing rotation of the reels as disposed in the left-hand direction;

FIG. 11 is a partially fragmentary exploded front elevational view of the reel;

FIG. 21 is a front elevational view of the rotatable lid member;

FIG. 22 is a top plan view of the rotatable lid member;

FIG. 23 is a partial cross sectional view taken along the line V—V in FIG. 22;

FIG. 24 is a cross sectional view taken along the line VI—VI in FIG. 22;

FIG. 25 is an enlarged cross sectional view of a principal part of the rotatable lid member in which the lid member is closed;

DESCRIPTION OF THE PREFERRED EMBODIMENT

Figure 1:
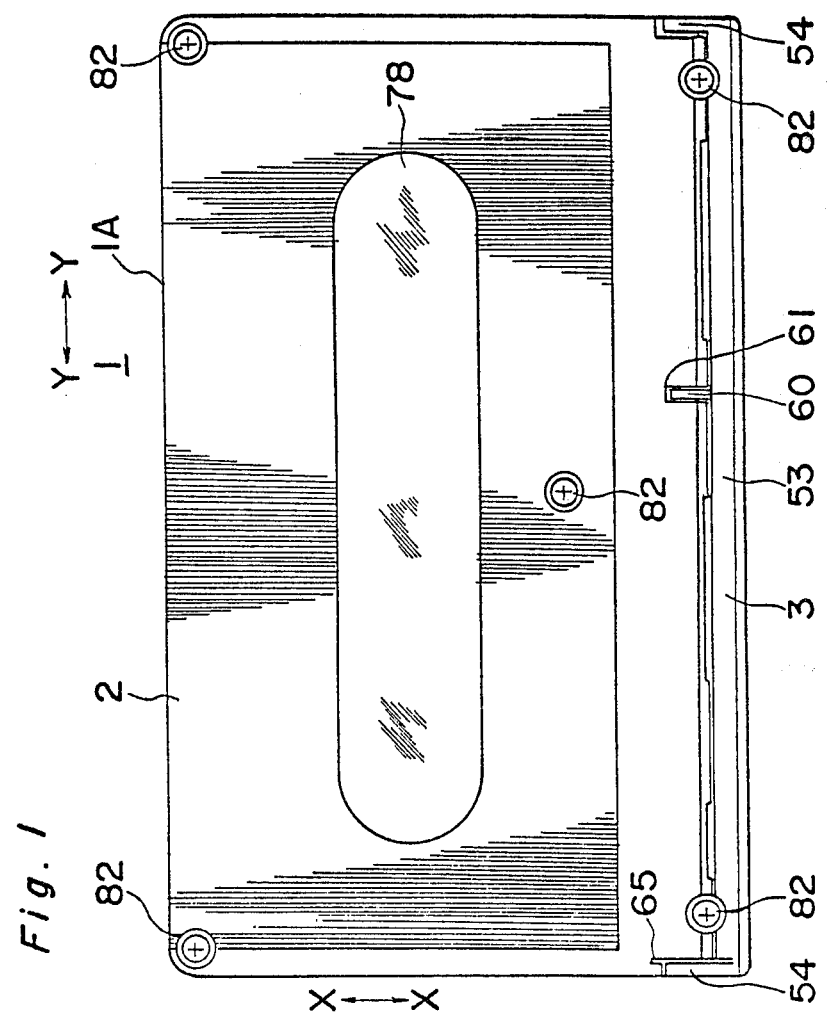
FIG. 1 is a top plan view of a magnetic recording tape cartridge according to the present invention.
Figure 2:
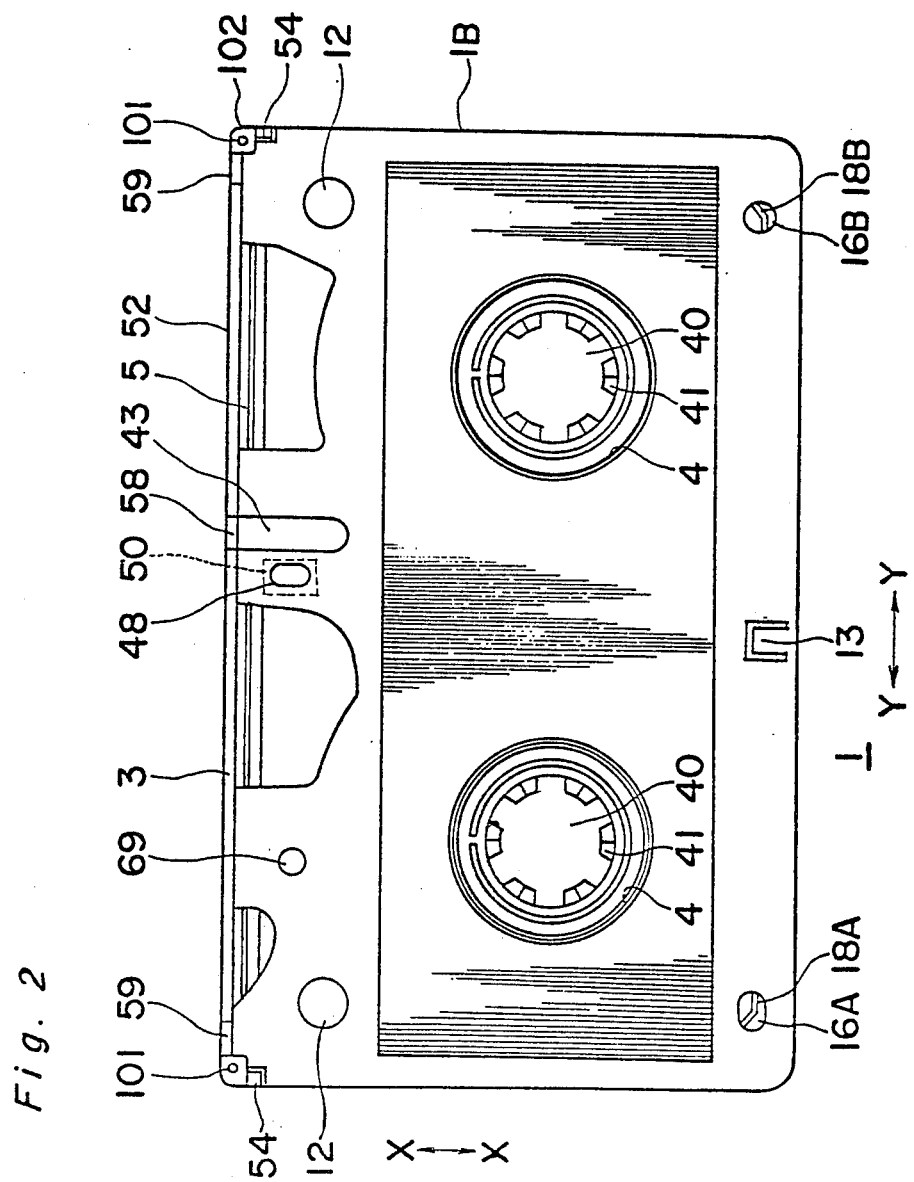
FIG. 2 is a bottom plan view of the magnetic recording tape cartridge of FIG. 1.

Referring now to FIGS. 1 to 3, there is seen a magnetic recording tape cartridge of the present invention comprising a case generally designated 1 composed of a top section 1A, a bottom section 1B, and an elongated lid member 3 rotatably mounted on the front portion of the top section 1A, each portion being made of a plastic material, such as polystyrene resin.

Figures 5, 6:
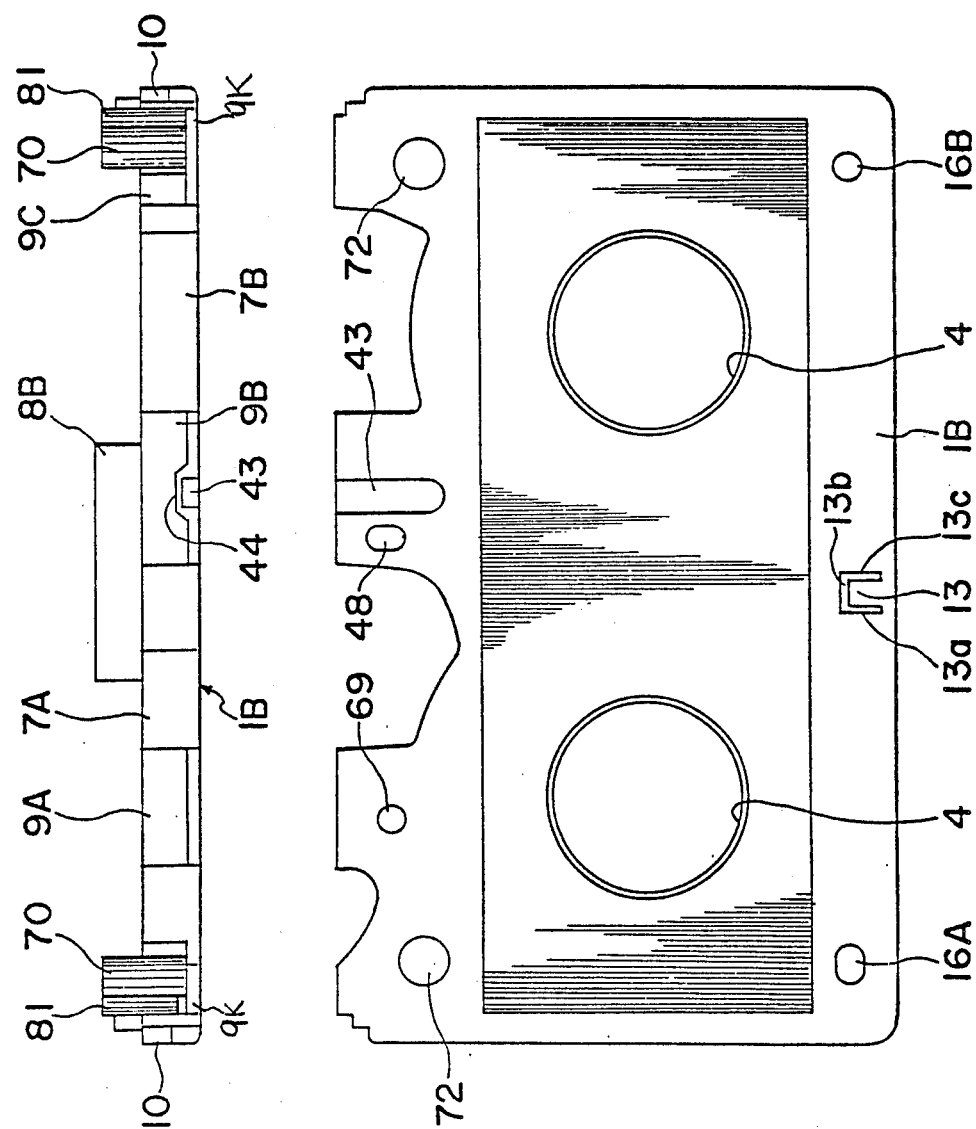
FIG. 5 is a front elevational view of a bottom section of the magnetic recording tape cartridge.
FIG. 6 is a bottom plan view of the bottom section of FIG. 5.

As shown in FIGS. 4 and 6, the bottom section 1B is provided at the generally central portion relative to a longitudinal direction X of the case 1 with a pair of through-holes 4 at a predetermined space relative to a lateral direction Y of the case 1 for receiving drive shafts of a recording/reproducing apparatus or a video tape player. A pair of reels 6 for winding a magnetic recording tape 5 are respectively rotatably mounted in the through-holes 4. Around the reels 6, there are provided front inner walls 7A and 7B and rear inner walls 8A, 8B and 8C respectively defining some clearances between the same and the outer peripheries of the reels 6, and the inner walls 7 and 8 are integrally formed with the bottom section 1B.

Each of the front inner walls 7A and 7B is formed by an arcuate wall conforming to part of the circular edge of the reel 6 and the front inner walls 7A and 7B are connected with each other by an intermediate wall 7C. The intermediate portion of the left side front inner wall 7A is connected with the right end portion of the left front outer wall 9A by means of a connecting wall 9D extending in the longitudinal direction X.

The left side front inner wall 7A is also connected with the left end portion of the intermediate front wall 9B by an arcuate connecting wall 9E, and the intermediate portion of the right hand side front inner wall 7B is connected with the right end of the intermediate front wall 9B by a connecting wall 9F so as to define a chamber for accommodation of a lid locking device, the details of which will be described hereinafter.

The right side front inner wall 7B is also connected with the right front wall 9C through a connecting wall 9G which extends from the right end portion of the front inner wall 7B to the left end of the right front wall 9C.

The right side rear inner wall 8C extends from a right side wall 10 toward a rear wall 11 to define a chamber 12C having generally a triangular shape in plan view for mounting a tape reel locking device in the rear corner of the bottom section 1B.

A similar chamber 12A is also defined in the left side rear corner of the bottom section 1B by the left side rear inner wall 8A.

The rear inner wall 8B having generally a V-shaped configuration in plan view has its both ends connected with the rear wall 11 in the intermediate portion thereof to form a central chamber 12B of generally a triangular shape in plan view. The central rear inner wall 8B is made higher than the rear wall 11 so that the upper end thereof comes close to the bottom inner surface of the top section 1A upon assembling of the bottom section 1B and the top section 1A.

The bottom section 1B is integrally provided in its bottom surface with an erase preventing member 13 of the magnetic recording tape in the interior of the central chamber 12B for preventing erroneous erasure of records.

The erase preventing member 13 is formed in the form of a foldable flap defined by slots 13a through 13c in the bottom face of the bottom section 1B with its one side connected with the foot portion of the rear wall 11 through a thinned portion 13d as shown in FIG. 7 so that the erase preventing member can be easily separated from the bottom section 1B. When the erase preventing member 13 is separated from the bottom plate 1B upon being bent and the member 13 thus separated received in the chamber 12B, it will neither engage with and damage the magnetic recording tape nor obstruct rotation of the reels 6.

Within a chamber 12A defined by the rear inner wall 8A in the left-hand direction, the side wall 10 and the rear wall 11, there are projected a boss 14A and a pivotal shaft 15A, and there are further defined a slightly elongated through-hole 16A for receiving a standard pin of a video tape player and an arcuate guide groove 17A arching about the pivotal shaft 15A. Within a chamber 12C defined by the rear inner wall 8C in the right-hand direction, the side wall 10 and the rear wall 11, there are also provided a boss 14B, a pivotal shaft 15B, a circular hole 16B for receiving a standard pin and an arcuate guide groove 17B, all of which are positioned symmetrically with the boss 14A, the pivotal shaft 15A, the elongated hole 16A and the guide groove 17A.

A rotation preventing member 18B for stopping rotation of the reel 6 is rotatably engaged with the pivotal shaft 15B. The rotation preventing member 18B is formed of a synthetic resin having low coefficient of friction, and comprises a sleeve 19B engaged with the outer periphery of the pivotal shaft 15B, a receiving member 20B extending from the outer periphery of the sleeve 19B and a pawl 21B formed in the free end of the receiving member 20B (see FIG. 8). The lower end of the pawl 21B extends slightly downwardly of the lower ends of the sleeve 19B and the receiving member 20B so that the lower end of the pawl 21B enters the guide groove 17B upon engagement of the rotation preventing member 18B and the pivotal shaft 15B. The receiving member 20B is provided with an L-shaped bent portion 22B in a part opposite to the circular hole 16B when the rotation preventing member 18B is engaged with the pivotal shaft 15B. The receiving member 20B is further provided in the inside of its lower end with an inclined portion 23B inclined with an angle of about 30° to 60°.

A rotation preventing member 18A to be engaged with the left-hand pivotal shaft 15A is, as shown in FIG. 10, symmetrical with the aforementioned rotation preventing member 18B, and also comprises a sleeve 19A, a receiving member 20A and a pawl 21A, in which the receiving member 20A is provided with a bent portion 22A in its center and an inclined portion 23A in its lower end.

A spring member 24B formed by a coiled spring is loosely fitted with the pivotal shaft 15B with interposition of the rotation preventing member 18B therebetween. As shown in FIG. 8, the spring member 24B has in its center an annular portion 25 formed by a plurality of windings, and the free end portions extending from the annular portion 25 are both bent in the longitudinal direction of the annular portion 25 to form elastic free ends 26A and 26B. The annular portion 25 is loosely fitted with the head of the pivotal shaft 15B with the elastic ends 26A and 26B slightly pressed against the elasticity of the spring member 24B and simultaneously inserted into the clearance between the side wall 10 and the receiving member 20B, and thereafter the elastic ends 26A and 26B are released. Then, by virtue of the restoring force of the spring member 24B, the elastic ends 26A and 26B are elastically made in contact with the outer surface of the receiving member 20B and the inner surface of the side wall 10 respectively, and the pawl 21B of the rotation preventing member 18B is elastically pressed against the reel 6 by the spring member 24B. Such construction simplifies provision and supporting of the spring member 24B. By this arrangement, the rotation preventing member 18B serves to stop rotation of the reels 6 when not used as mentioned later.

As shown in FIGS. 8 and 9, the rotation preventing member 18B which serves as a standard pin pressing member and the spring member 24B are respectively engaged with a pivotal shaft 15B provided inwardly of the cartridge case 1 in a position corresponding to the standard pin insertion through-hole 16B, so as to form an elastic pressing member for engaging with the standard pin.

The through-hole 16B has a diameter fairly larger than the diameter of the standard pin 42 of the video tape player up to such an extent that the standard pin 42 can be loosely fitted in the hole 16B, so that when the cartridge case is mounted on the video tape player, the standard pin 42 can easily pass the hole 16B thereby entering the interior of the cartridge case 1 with rough adjustment of position of the cartridge case 1 relative to a standard position of the video tape player.

In this embodiment, the rotation preventing member 18B is provided with a recessed portion to hold the standard pin so that the standard pin is continuously pressed against the predetermined position in the periphery of the through-hole 16B. That is, as hereinbefore described, the receiving member 20B has a bent portion 22B being L-shaped in plan view so as to securely hold the standard pin. For holding the standard pin, the receiving member 20B may have the bent portion 22 in the form of an arcuate shape in plan view.

The inclined portion 23 in this embodiment is provided substantially along the entire bottom surface of the receiving member 20, though the inclined portion may only be provided on the portion being in contact with the standard pin since the inclined portion functions merely to facilitate receiving of the top end of the standard pin 42.

As well known to those skilled in the art, a conventional video tape player provided with a holder for receiving a cartridge case to be mounted in the bottom of the holder has a pair of positioning projections which serves as rough positioning members. Thus when the cartridge is mounted in the holder, the cartridge is engaged with the positioning projections at the front side thereof.

Since the conventional video tape recorder is also provided with two standard pins, two standard pin insertion through-holes 16A and 16B are provided rearwardly in the bottom surface of the cartridge case as shown in FIG. 4. However, the rotation preventing member 18B acting to press the standard pin may be provided corresponding to any one of the through-holes 16A and 16B so long as the positioning projections of the holder of the video tape player are adapted to engage with the front end portion of the cartridge case when the same is mounted on the video tape player. By the arrangement as mentioned above, the standard pin 42 can be smoothly inserted into the through-hole 16B and is firmly clamped by the receiving member 22B and the inner surface wall of the through-hole 16B to secure the cartridge case 1 in a correct position of the video tape player as hereinafter explained.

In this embodiment, the free end of the receiving member 20B is adapted to function as a reel rotation stopping and rotation stopping release member.

As shown in FIG. 11, each of the reels 6 comprises a lower flange 28B having a hub 27 integrally projecting therefrom and an upper flange 29. The lower flange 28 is made of opaque synthetic resin, and has a plurality of teeth 30 formed at regular intervals along the entire outer periphery thereof.

Figure 12:
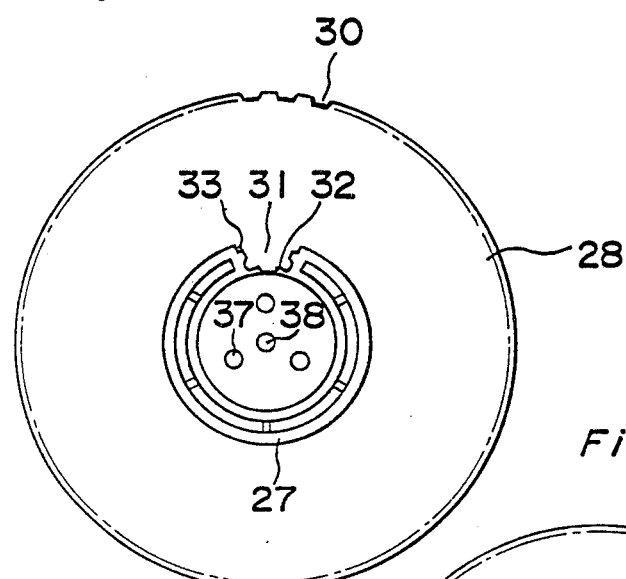
FIG. 12 is a top plan view of a lower flange of the reel.
Figure 14:
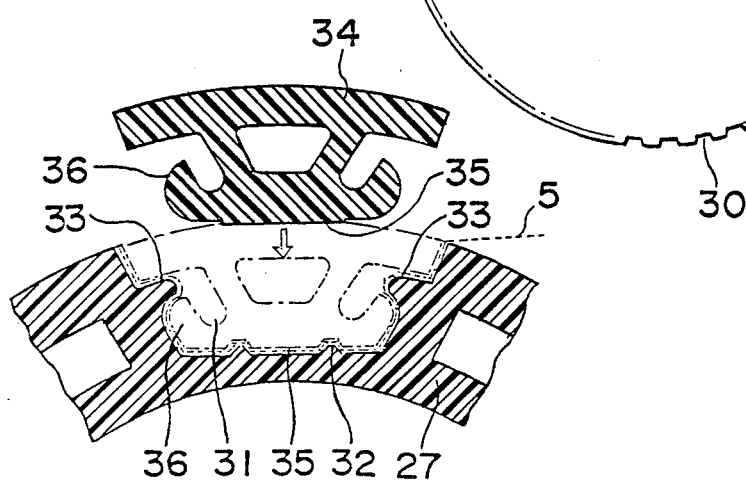
FIG. 14 is an enlarged cross sectional view of a principal part of the reel showing the condition of engagement of a tape stopper.

As shown in FIGS. 12 and 14, the hub 27 is provided in its outer periphery with a concave portion 31 opening toward the outer peripheral surface of the hub 27 for engagement with a tape stopper as hereinafter described. The concave portion 31 is provided in its bottom with one or more tape nippers 32 and in both side walls with a pair of projections 33. A tape stopper 34 to be engaged with the concave portion 31 through an end of the magnetic recording tape 5 has a lower end surface 35 which is flat at least in a portion opposite to the tape nipper 32 and a pair of elastic projections 36 having some flexibility on both sides of the lower end surface 35 (see FIG. 14). Therefore, when the tape stopper 34 is pressed into the concave portion 31 through the end of the magnetic recording tape 5, the elastic projections 36 are both inwardly pressed to be deformed and go beyond the projections 33 of the concave portion 31 respectively, thereby making the tape stopper 34 inserted within the concave portion 31. Upon insertion within the concave portion 31, the tape stopper 34 is prevented from being disengaged from the concave portion 31 by function of the projections 33 as stoppers. The magnetic recording tape 5 is securely held between the tape nipper 32 and the lower end surface 35 of the tape stopper 34 by the pressing force of the tape stopper 34 and between the elastic projections 36 and the projections 33 by the elastic force of the elastic projections 36 respectively so that the end of the magnetic recording tape 5 comes in contact with the hub 27.

As shown in FIGS. 11 and 12, the hub 27 has in its upper portion bonding projections 37 for bonding the upper flange 29 to the hub 27 and a central projection 38 of the reel 6. The upper flange 29, made of transparent synthetic resin, has holes 39 for receiving the bonding projections 37 and the central projection 38 of the hub 27 (see FIG. 11). After the bonding projections 37 and the central projection 38 are inserted into the holes 39, the upper ends of the bonding projections 37 are thermally bonded to the upper flange 29 to secure the upper flange 29 to the hub 27. The central projection 38 passes through a hole 39 to project outwardly from the upper flange 29.

Figure 13:
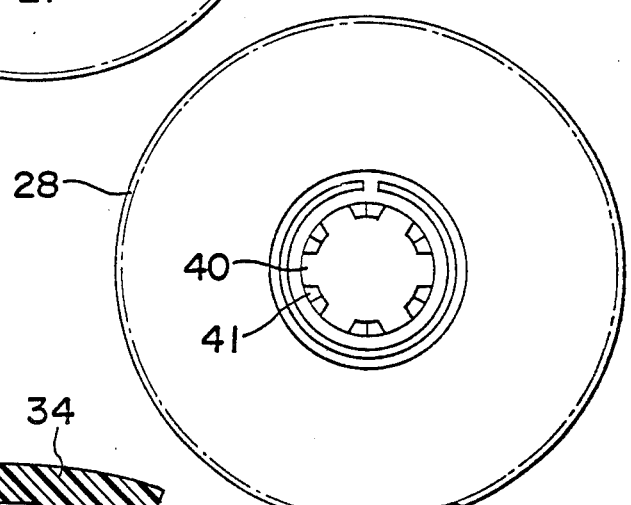
FIG. 13 is a bottom plan view of the lower flange of FIG. 12.

As shown in FIG. 13, the hub 27 has in its lower portion a concavity 40 for receiving a drive shaft of a video tape player, which has a plurality of projections 41 formed at regular intervals in its periphery for transmitting driving force to the magnetic recording tape. When the reels 6 are placed on predetermined positions of the bottom section 1B, the concavities 40 of the hub 27 are properly located on the through-holes 4 of the bottom section 1B.

Figure 15:
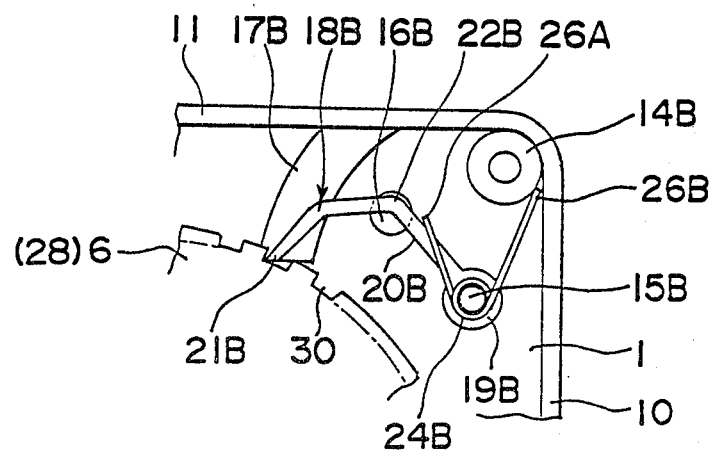
FIG. 15 is an enlarged top plan view of the member for preventing rotation of the reel in a condition the reel is prevented from rotation.

Upon placement of the reels 6 on the predetermined positions of the bottom section 1A, the rotation preventing member 18B and the spring member 24B are respectively engaged with the pivotal shafts 15B and the pawls 21B of the rotation preventing member 18 are engaged in the teeth 30 of the reels 6 to prevent rotation of the reels 6. In this condition, the bent portions 22 of the receiving members 20 of the rotation preventing members 18 are located above the circular holes 16 as shown in FIGS. 4, 9 and 15.

Operation of the rotation preventing member 18B during mounting of the magnetic recording tape cartridge in the video tape player is hereinafter described.

When the cartridge case 1 is inserted in the holder of the video tape player, the cartridge case is roughly positioned on the video tape player with the front edges of the flanges 9k (see FIG. 7) of the bottom section 1B which are exposed from the openings 59 of the lid member 3 abutted onto the positioning projections of the holder of the video tape player.

When the cartridge holder is lowered, the standard pin 42 can be inserted into the hole 16B and the top end of the standard pin 42 is engaged with the inclined portion 23B of the receiving member 20B. As the standard pin 42 is entered in the cartridge case 1, the inclined portion 23B engages with the standard pin 42, in turn, the receiving member 20B is rotated about the pivotal shaft 15 against the restoring force of the spring member 24B. Then the standard pin 42 becomes clamped by the receiving member 20B and the inner wall of the through-hole 16B, so that the cartridge case is securely positioned in the predetermined position or standard position of the video tape player.

Figure 16:
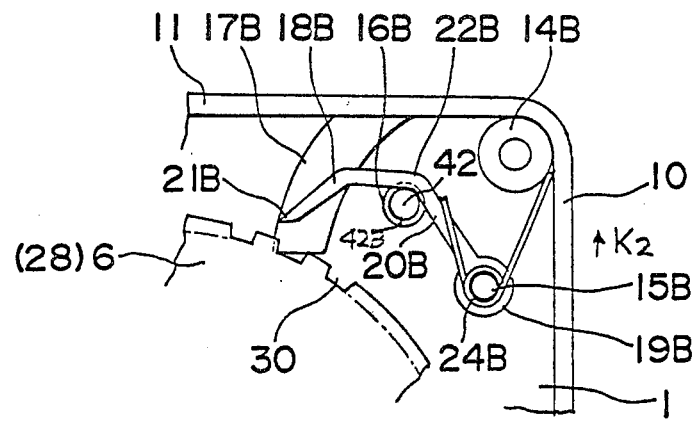
FIG. 16 is an enlarged top plan view of the member for preventing rotation of the reel in a condition the reel is allowed to rotate.

On the other hand, the pawls 21B are disengaged from the teeth 30 of the reels 6 to release the reels 6 from being prevented from rotation (see FIG. 16).

By provision of the bent portions 22 in the receiving members 20 in portions opposite to the circular holes 16, the rotation preventing members 18 can be smoothly and securely engaged with the standard pins 42.

Further, the magnetic recording tape cartridge is properly located in a predetermined position, i.e., a standard position in the tape player by engagement of the standard pins 42 and the circular holes 16A and 16B of the bottom section 1B.

When the magnetic recording tape cartridge is removed from the video tape player, the standard pins 42 are disengaged from the circular holes 16A and 16B so that the rotation preventing members 18 are rotated against the reels 6 by restoring force of the spring members 24 and the pawls 21 are again engaged with the teeth in the outer peripheries of the reels 6 to prevent rotation of the reels 6.

Although the various constructions described hereinafter are not directly related to the present invention, explanation is made merely to make clear the detail of the magnetic recording tape cartridge in which the present invention is employed.

Figure 17:
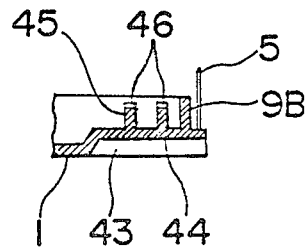
FIG. 17 is a partial cross sectional view taken along the line II—II in FIG. 4.

As shown in FIGS. 3, 5 and 17, a groove 43 for engagedly receiving a member (not shown) for preventing erroneous mounting of the cartridge onto the recording/reproducing apparatus is provided in the lower portion of the front wall 9B of the bottom section 1B in a position slightly deviated from the center thereof. In order to facilitate forming of the groove 43, the bottom section 1B is formed in its bottom face with a trapezoidal raised portion 44. A part of the raised portion 44 extending beyond the front wall 9B functions to support the magnetic recording tape 5 keeping the same in a normal position. Thus, while the magnetic recording tape 5 is stopped, the intermediate portion of the tape 5 extending along the front surface of the magnetic recording tape cartridge is supported by the raised portion 44 in a slightly raised condition (see FIGS. 3 and 17).

The bottom section 1B is further provided rearwardly of the front wall 9B with a pair of supporting projections 45 extending substantially in parallel with the front wall 9B, which are respectively provided in the upper surfaces with groove-shaped bearings 46. A lock lever 47 having a rectangular portion is rotatably suspended between the supporting projections 45 by a pair of pins projecting from both sides of the lock lever, being rotatably mounted in the grooves of the bearings 46, the details of the lock lever 47 will be hereinafter described. Further, in the vicinity of the raised portion 44, there is formed a slightly elongated hole 48 for receiving a release pin which is provided in the recording/reproducing apparatus.

Since the bearings 46 are designed to have a depth of which size is substantially identical with that of the diameter of the rotating pins 49, the rotating pins 49 are fully received in the grooves of the bearings 46 without projecting outwardly from the upper surface of the supporting projections 45. The top section 1A is provided in its inner surface also with a pair of supporting projections 62 which are opposite to the supporting projections 45 of the bottom section 1B, though, the supporting projections 62 of the top section 1A have flat lower surfaces. Upon assembling of the top section 1A and the bottom section 1B, the rotating pins 49 are rotatably supported between the supporting projections 45 and 62 without being shaken (see FIG. 19).

Figure 18:
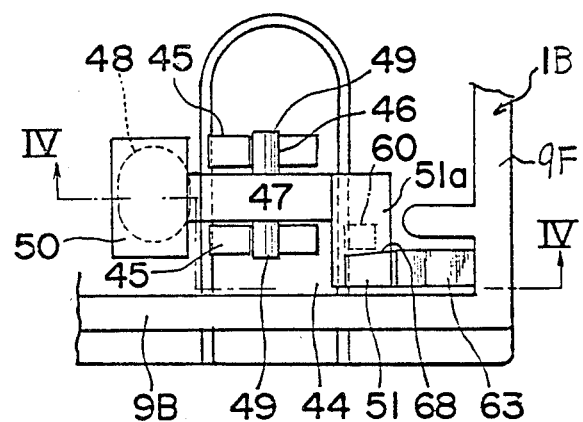
FIG. 18 is an enlarged top plan view of a part of the bottom section showing the condition of disposition of a lock lever.
Figure 19:
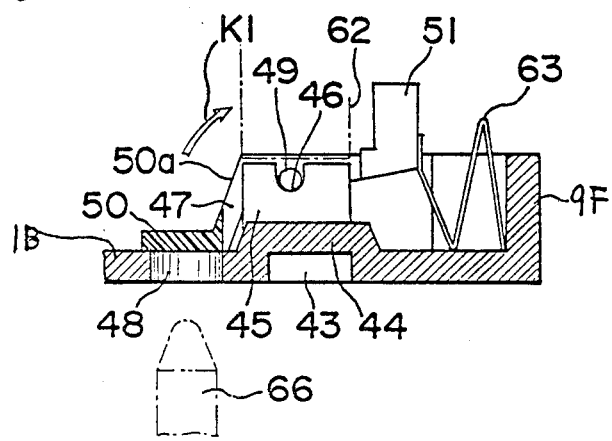
FIG. 19 is a partial cross sectional view taken along the line IV—IV in FIG. 18.
Figure 20:
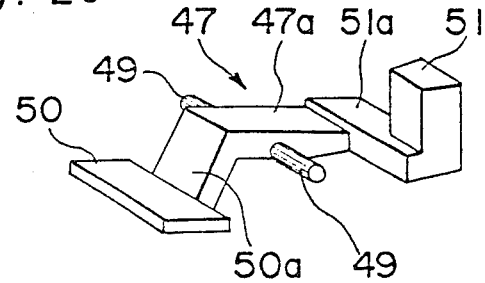
FIG. 20 is a perspective view of the lock lever.

As shown in FIGS. 18 to 20, the lock lever 47 comprises on its one end a pressing member 50 in the form of a plate which is connected with the intermediate portion 47a of the lever 47 through an inclined connecting plate 50a with the height of the pressing member 50 being lower than the intermediate portion 47a. On the other end of the lock lever 47 there is provided a stop member 51 which is projected upwardly from one end of a connecting plate 51a connected with the other end of the intermediate portion 47a.

The lock lever 47 is so suspended on the bearings 45 that the pressing member 50 is opposed just above the hole 48 defined in the bottom plate of the bottom section 1B and the stop member 51 is located near the corner defined by the front wall 9B and the connecting wall 9F. A plate spring 63 bent in the form of a bellows is inserted between the stop member 51 of the lock lever 47 and the connecting wall 9F, so that the lock lever 47 is elastically biased by the plate spring 63 to close the elongated hole 48 by the pressing member 50. The stop member 51 of the lock lever 47 is slidably in contact with the plate spring 63 so that the stop member 51 may be inclined toward the plate spring 63 compressing the same. The lock lever 47 functions to prevent opening, i.e., rotation, of the lid member 3, which now is placed in a closed condition.

As shown in FIGS. 21 to 23, the rotatable lid member 3 comprises an elongated flat front plate 52, an upper plate 53 projected in a vertical direction from the front plate 52 and a pair of end plates 54 projected from both ends of the front plate 52 in the same direction as the upper plate 53, and the end plate 54 as shown in the left-hand direction and the other end plate 54 as shown in the right-hand direction are respectively provided with inwardly projecting first and second pins 55 and 56 (FIG. 22). The rotatable lid member 3 is rotatably supported by the top section 1A with the pivotal pins 55 and 56 rotatably engaged in receiving holes 57 (FIG. 36) defined in both side surfaces of the top section 1A. The rotatable lid member 3 is continuously elastically biased to a closed position by a coiled spring 65 which is loosely fitted with the first pivotal pin 55 with one bent end 64A in contact with the rotatable lid member 3 and the other bent end 64B in contact with the top section 1A.

As shown in FIGS. 2 and 21, a recess 58 for receiving the erroneous insertion preventing member of a recording/reproducing apparatus (not shown) is provided in the lower end of the front plate 52 of the lid member 3 in a portion opposite to the groove 43 of the bottom section 1B. Further, a pair of recesses 59 for receiving locating members (not shown) provided within a magnetic recording tape cartridge holder of the recording/reproducing apparatus are formed in both ends of the lower portion of the front plate 52. As shown in FIGS. 22 and 23, the upper plate 53 is provided in its side with a downwardly extending hook-shaped member 60 in a portion opposite to the lock lever 47. The hook-shaped member 60 passes through a hole 61 defined in the top section 1A to extend toward the stop member 51 of the lock lever 47 (see FIGS. 1 and 25).

The operation of the rotatable lid member 3 and the lock lever 47 will hereinafter be described. In FIGS. 18, 19, 25 and 27, the rotatable lid member 3 is shown in a closed condition. As hereinabove described, the receiving hole 48 is covered by the pressing member 50 of the lock lever 47 by the pressing force of the plate spring 63. The stop member 51 is, as shown in FIG. 25, positioned ahead of the direction of rotation of the hook-shaped member 60 of the rotatable lid member 3 to prevent rotation of the same. Thus, by engagement of the stop member 51 and the hook-shaped member 60, the rotatable lid member 3 is locked in a closed position not to be opened even by external force.

Figure 26:
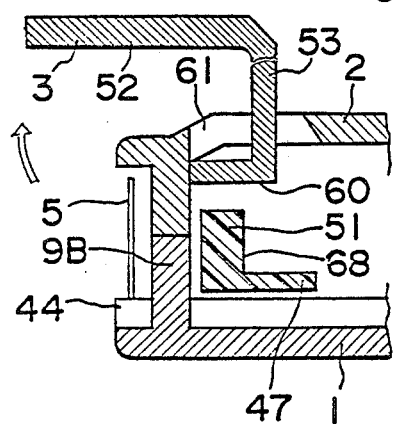
FIG. 26 is an enlarged cross sectional view of a principal part of the rotatable lid member in which the lid member is opened.

When the magnetic recording tape cartridge is mounted in the recording/reproducing apparatus, the release pin 66 (FIG. 19) is inserted into the elongated hole 48 to upwardly press the pressing member 50 against the elasticity of the plate spring 63, thereby rotating the lock lever 47 clockwise about the rotating pin 49 as indicated by an arrow mark K1 in FIG. 19. By virtue of this, the plate spring 63 is compressed and the stop member 51 is lowered as shown in FIGS. 25 and 26. Thus the stop member 51 is disengaged from the hook-shaped member 60 so that the lid member 3 is made rotatable.

Figure 27:
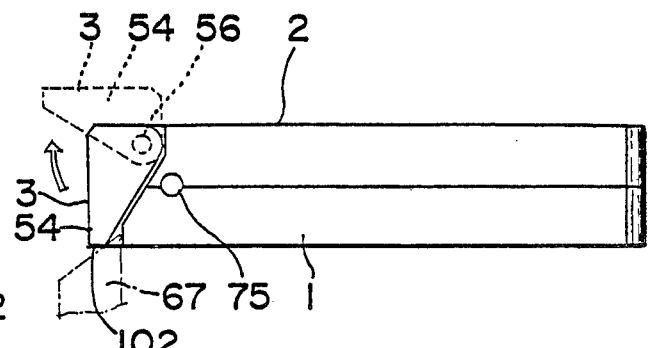
FIG. 27 is a side elevational view of the magnetic recording tape cartridge showing opening movement of the rotatable lid member.
Figure 28:
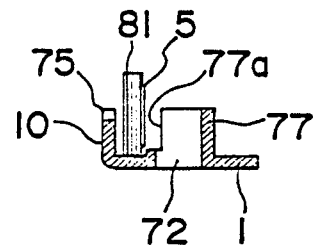
FIG. 28 is a partial cross sectional view taken along the line III—III in FIG. 4.

Then, as shown in FIG. 27, the lower end of the rotatable lid member 3 is pushed up by a lid opening member 67 to be opened against the expanding force of the coiled spring 65 which functions to close the rotatable lid member 3. When opened, the rotatable lid member 3 comes in a position indicated by broken lines in FIG. 27.

The rotatable lid member 3 is provided in both ends of its lower surface with flat plates 102 for engaging with the lid opening member 67 so as to facilitate opening of the lid member 3 by the lid opening member 67, and each of the flat plates 102 has in the central portion of small hole 101 extending near the upper plate 53 for preventing warping deformation by contraction during molding of the end plate 54 defining the flat plate 102 (see FIG. 21).

When the magnetic recording tape cartridge is removed from the recording/reproducing apparatus, separating from the lid opening member 67, the rotatable lid member 3 is rotated to its closed position by restoring force of the coiled spring 65. On the other hand, the release pin 66 is disengaged from the elongated hole 48 of the bottom section 1B so that the stop member 51 is upwardly pressed by restoring force of the plate spring 63 forwardly of the direction of rotation of the hook-shaped member 60 to be in contact therewith while the pressing member 50 closes the open end of the elongated hole 48 to complete the locking operation. The side 68 of the stop member 51 coming in contact with the hook-shaped member 60 is preferably inclined or rounded for facilitating movement of the stop member 51 forward of the direction of rotation of the hook-shaped member 60.

Though the plate spring 63 is provided rearward of the stop member 51 in this embodiment, the pressing member 50 may be elastically pressed toward the elongated hole 48 by interposing a spring member such as a coiled spring between the pressing member 50 and the top section 1A.

As shown in FIGS. 2 and 4, a circular through-hole 69 is formed in the front portion of the bottom section 1B a predetermined distance from the elongated hole 48. The elongated hole 48 and the through-hole 69 make a pair to receive a location auxiliary pin (not shown) for locating the magnetic recording tape cartridge in a predetermined position within the recording/reproducing apparatus.

As shown in FIG. 4, the bottom section 1B is provided in both end portions of the front surface with a pair of bosses 14C and 14D for engaging respectively with fastening screws and in the substantially central portion of the front surface forward of the junction 7C of the front inner walls 7A and 7B with a similar boss 14E.

A hollow pin 70 is rotatably fitted outwardly of each of the bosses 14C and 14D so that the respective hollow pins 70 act to guide the magnetic recording tape 5 when it runs. As each of the bosses 14C and 14D acts as a support member of the hollow pin 70, it is advantageous that the space occupied by the taper guide members can be descreased compared to such a case where the tape guide members are provided separately from the respective bosses for the fastening screws.

Figure 30:
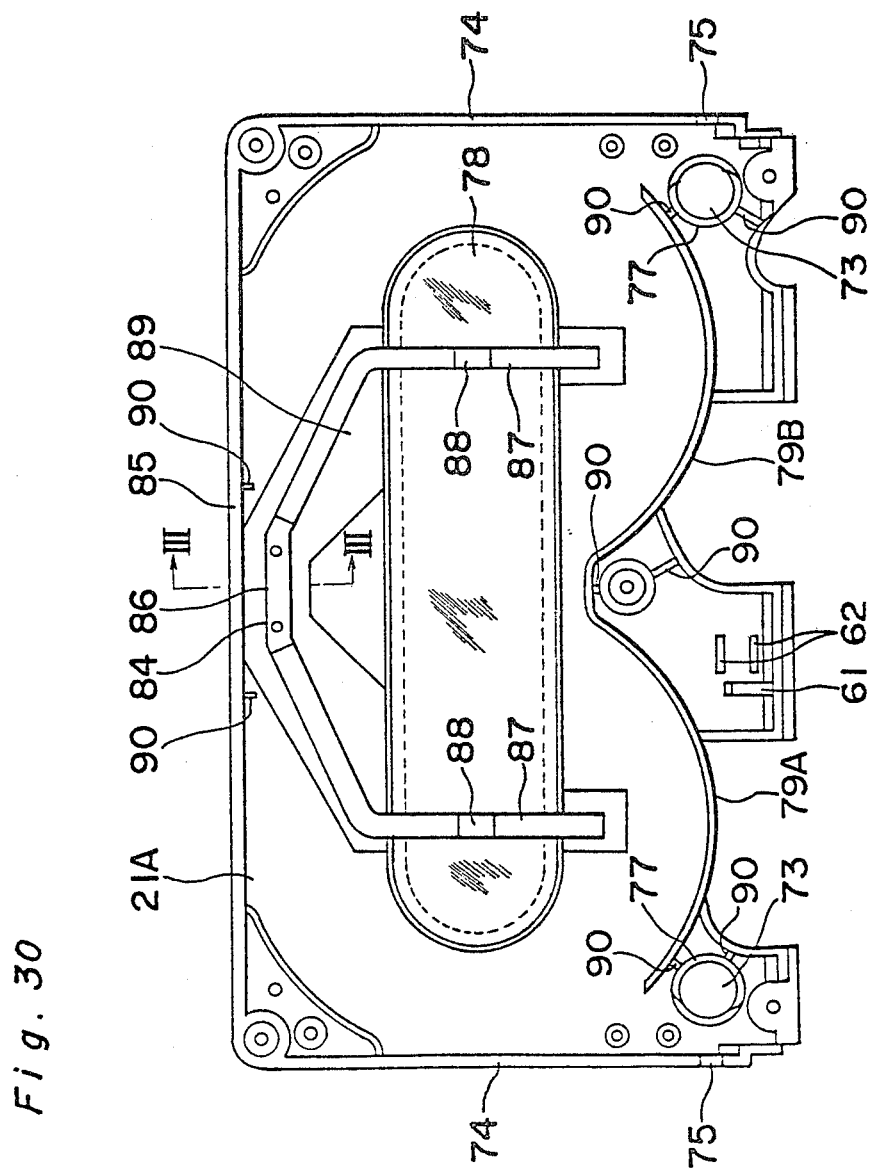
FIG. 30 is a bottom plan view of the top section.
Figure 36:
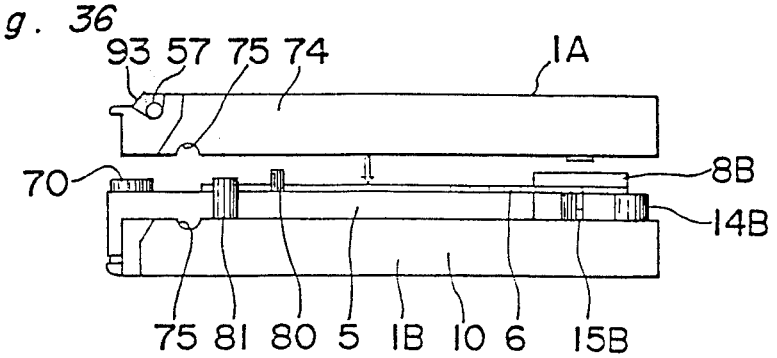
FIG. 36 is a side elevational view of the magnetic recording tape cartridge showing the assembling thereof.

Holes 72 are formed rearwardly of the hollow pins 70 to receive cylindrical light sources 71 (not shown) for detecting the forward and rear ends of the magnetic recording tape 5. The top section 1A is, as shown in FIG. 30, provided in positions opposite to the holes 72 of the bottom section 1B with a pair of concavities 73 for receiving the cylindrical light sources. Further, the side walls 10 and 74 of the top section 1A and the bottom section 1B are provided in positions opposite to the through-holes 72 and the concavities 73 with semicircular recesses 75 to define a circular hole 75 for receiving the light source upon assembling of the top section 1A and the bottom section 1B as shown in FIG. 36.

When the magnetic recording tape cartridge is set in the recording/reproducing apparatus, the cylindrical light sources are inserted into the holes 72 and the concavities 73, and a light receiving element 76 having a photo diode opposite to the light source is placed on the side surface of the magnetic recording tape cartridge (see FIG. 4). In operation, the magnetic recording tape 5 runs traversing between the light source and the light receiving element 76 and 76' and the forward and rear ends of the magnetic recording tape 5 are respectively connected with light-permeable leader tapes (not shown) made of polyester films.

The forward end of the magnetic recording tape 5 is detected by the cylindrical light source inserted into the through-hole 72 existing in the left-hand portion in FIG. 4 and the light receiving element 76, and the rear end of the same is detected by the light source inserted into the through-hole 72' existing in the right-hand portion in FIG. 4 and the light receiving element 76' respectively. That is, the forward end of the magnetic recording tape 5 is detected by the light receiving element 76 sensing an optical change of rays of light irradiated toward the leader tape and the magnetic recording tape 5 from permeation to interception, and the rear end of the magnetic recording tape 5 is detected by the light receiving element 76' sensing an optical change of said rays of light from interception to permeation.

To precisely conduct the optical detection of the forward and rear ends of the magnetic recording tape 5 without being affected by any noise, the magnetic recording tape cartridge according to the present invention is designed as follows: First, the sensor members, i.e., the cylindrical light sources and the light receiving elements are independently disposed for detecting the forward end and for detecting the rear end. Second, the through-hole 72 is provided in the vicinity of the side wall 10 of the bottom section 1B to make the distance of the light path from the light source to the light receiving element 76 as short as possible. Third, a cylindrical shield wall 77 is formed around the through-hole 72 with a window 77a formed in a part opposing to the light penetrating hole 75 to give a directivity of light of the cylindrical light source relative to the light receiving element 76 preventing dispersion of light. Fourth, for preventing influence by outside light passing through a window 78 formed in the top section 1A for displaying the volume of windings of the magnetic recording tape 5, the front inner walls 7A and 7B of the bottom section 1B are connected with each other to extend near the side walls 10 and the front inner walls 79A and 79B of the top section 1A are also connected with each other to extend near the side walls 74 to prevent the outside light entering the window 78 from reaching the light receiving elements 76. Fifth, a pin-shaped first guide member 70 in the form of a projecting pin and a second guide member in the form of a free roller 81 are successively provided between the hollow pin 70 which functions as one of the guide members for the magnetic recording tape 5 and the reel 6 along the path of the recording tape 5 to make the magnetic recording tape 5 run in a zigzag manner along the first and second guide members 80 and 81 and the hollow pin 70 functioning as a third guide member so that the magnetic recording tape 5 is guided in the vicinity of the outer peripheries of the through-hole 72 and the concavity 73 to make the distance between the light source and the magnetic recording tape 5 as short as possible. The magnetic recording tape 5 is prevented from being loosened in the vicinity of the through-hole 72 upon stoppage by being carried in a zigzag manner along the first and second guide members 80 and 81 and the hollow pin 70 in a relatively short distance, and the end of the magnetic recording tape 5 can be correctly detected simultaneously with the starting thereof.

The shapes of the guide members 70, 80 and 81 can be optionally selected depending on factors such as tension on the magnetic recording tape 5 during operation.

Further, though the front inner walls 7A, 7B, 79A and 79B, functioning as shielding members, are provided in the top and bottom sections 1A and 1B in the embodiment, the front inner walls may be provided only in one of the sections to extend near the other section.

As shown in FIG. 4, the boss 14E in the bottom section 1B is, different from the other bosses 14A to 14D, provided between the two reels 6, and is relatively near the reels 6. It tends to occur that when a tapping screw 82 (FIG. 4) is threadedly engaged with the boss 14E during assembling of the top and bottom sections 1A and 1B, scraps of synthetic resin possibly enter the interior of the cartridge case through a clearance in the juncture of the top and bottom sections 1A and 1B to damage the magnetic recording tape 5. For preventing this, the front inner walls 7A and 7B are elongated and connected at a position between the boss 14E and the peripheral edge of the reels 6 so that the boss 14E is enclosed in a chamber 83 defined by the front inner walls 7A and 7B and the front wall 9B, whereby the boss 14E can be separated from the reels 6.

Figure 29:
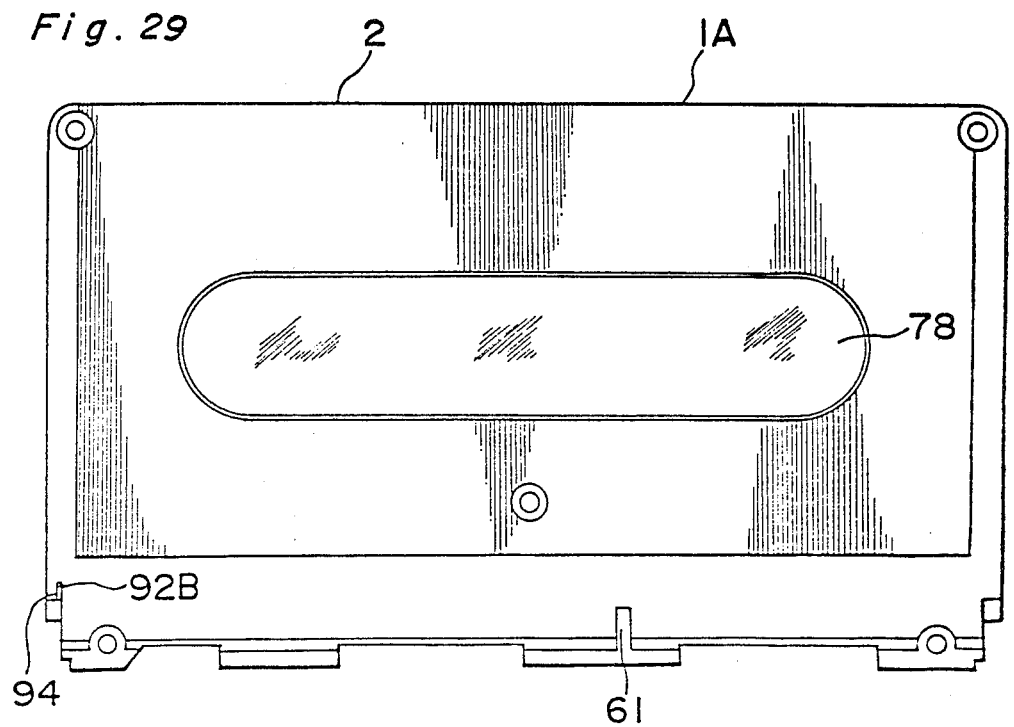
FIG. 29 is a top plan view of the top section.

As shown in FIGS. 29 and 30, the window 78 for comprehending the amount of tape 5 wound on the respective reels 6 is formed by a relatively long transparent synthetic resin plate extending over both reels 6. By this arrangement, the condition of the magnetic recording tape 5 in use is precisely comprehended by examining the difference in volume of windings of the tape 5 between the retracting reel 6 and the take up reel 6', for reducing the number of parts of the window 78 and the processes of mounting the same to the top section 1B and for a requirement in design. In this embodiment, therefore, the spring plate 84 is provided between the window 78 and the rear wall 85 of the upper case 2 as shown in FIG. 30.

Figure 32:
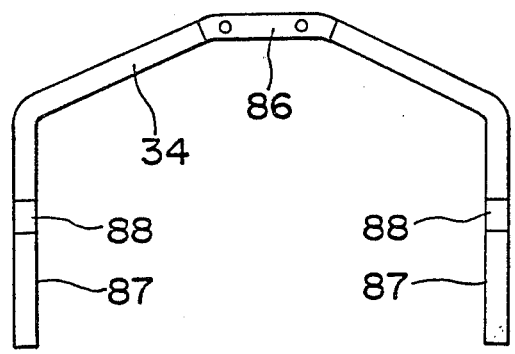
FIG. 32 is a top plan view of a spring plate.
Figure 33:
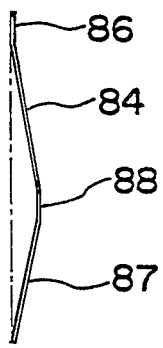
FIG. 33 is a side elevational view of the spring plate of FIG. 32.

A generally U-shaped spring plate 84 is secured to the bottom face of the top section 1A to press both of the reels 6 toward the bottom section 1B. The spring plate 84 is made of, for example, a thin plate of stainless steel, substantially U-shaped in plan view as shown in FIGS. 30 and 32, and comprises a central base portion 86 and a pair of pressing members 87 extending toward the reels 6. The pressing members 87 have flat portions 88 coming in contact with pointed ends of the central projections 38 of the reels 6. As shown in FIG. 30, the top section 1A has in its inner surface opposite to the spring plate 84 a shallow recess 89 for widening the allowable range of vertical movement of the spring plate 84.

Figure 34:
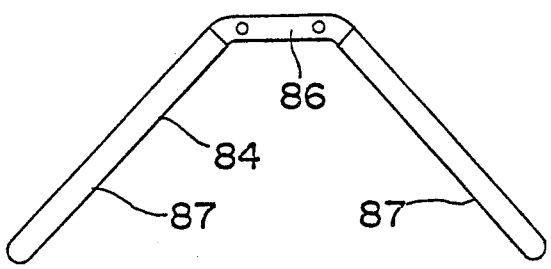
FIG. 34 is a top plan view of a modified spring plate.
Figure 35:
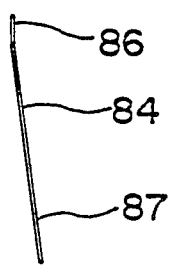
FIG. 35 is a side elevational view of the modified spring plate of FIG. 34.

FIGS. 34 and 35 respectively show a modification of the spring plate 84, which is generally V-shaped in plan view.

Figure 31:
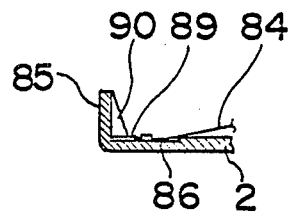
FIG. 31 is a cross sectional view taken along the line VII—VII in FIG. 30.

Since the spring plate 84 is provided between the window 78 and the rear wall 85 of the top section 1A, there is no space to form a central rear wall for controlling the location of the reels 6 in the top section as provided in the prior art. Such a control wall is provided in the bottom section 1B as hereinabove described. By this arrangement, the central portion of the rear wall 85 of the top section 1A may be weak in terms of its shock-proof property and tends to be deformed when the top section 1A is removed from a mold after the molding of the top section is completed, and thus the rear wall 85 is integrally provided in its interior with reinforcing ribs 90 (see FIGS. 30 and 31).

Further, in this embodiment, the top and bottom sections 1A and 1B are also respectively provided with reinforcing ribs 90 for improving the shock-proof property of the boss 14E and the shield wall 77 and preventing the same from being deformed when the top section 1A and the bottom section 1B are removed from corresponding molds after forming. Provision of the reinforcing ribs 90 further improve the fluidity of the synthetic resin within the molds for forming both sections 1A and 1B.

The order of assembling of the magnetic recording tape cartridge as hereinabove explained will be hereinafter described.

The retracting reel 6 and the take-up reel 6 are placed on the bottom section 1B and the magnetic recording tape 5 is set thereon in a predetermined condition. Then the top section 1A is placed (FIG. 36) to be assembled with the bottom section 1B and fastened together by the tapping screws 82.

Figure 38:
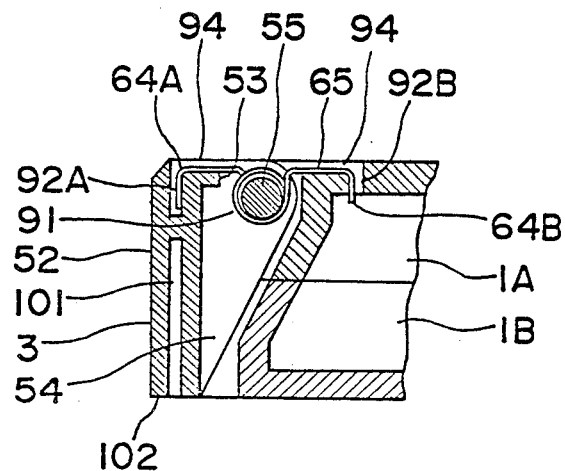
FIG. 38 is a partial enlarged cross sectional view of a principal part of the magnetic recording tape cartridge showing engagement of the cartridge case and the rotatable lid member.

Apart from this, a coil-like portion 91 of the coiled spring 65 for elastically pressing the rotatable lid member 3 is loosely fitted with the first pivotal pin 55 of the rotatable lid member 3. As shown in FIG. 38, the coiled spring 65 comprises a pair of free ends horizontally extending from both sides of the coil-like portion 91 to define downwardly bent end portions 64A and 64B. As hereinabove described, the coil-like portion 91 of the coiled spring 65 is loosely fitted with the first pivotal pin 55 and one bent end portion 64A is inserted into a hole 92A formed in the end of the upper plate 53 of the rotatable lid member 3 whereby the other bent end portion 64B is upwardly manually raised against the elasticity of the coiled spring 65.

Figure 37:
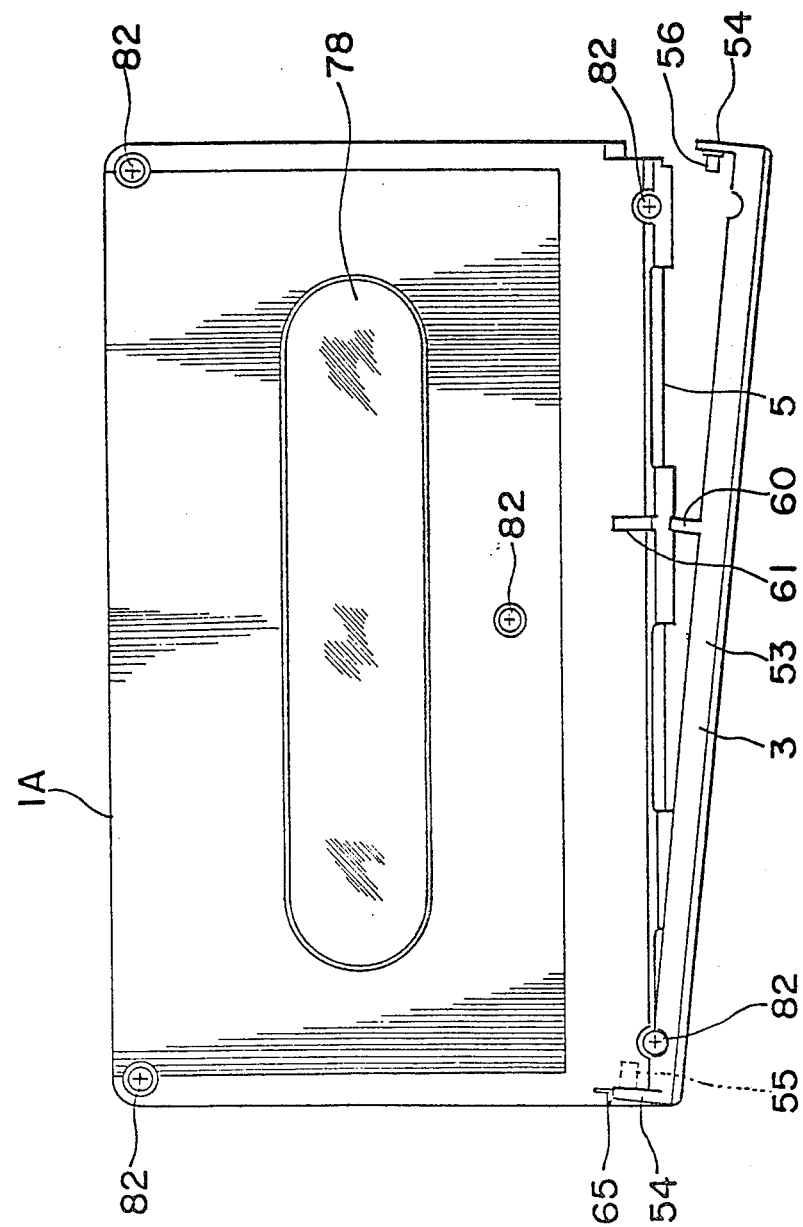
FIG. 37 is a top plan view of the magnetic recording tape cartridge showing a way of assembling the rotatable lid member.

Under this condition, the first pivotal pin 55 of the rotatable lid member 3 is inserted into the supporting hole 57 formed in the side wall 74 of the top section 1A as shown in FIG. 37 and the other bent end portion 64B of the coiled spring 65 is inserted into a hole 92B formed in the upper surface of the top section 1B (see FIGS. 29 and 38).

Figure 39:
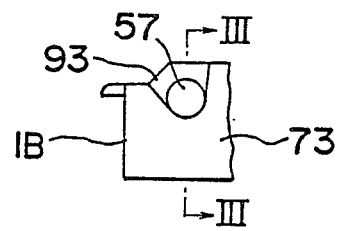
FIG. 39 is a partial enlarged side elevational view of a part of the top section in the vicinity of a supporting hole.
Figure 40:
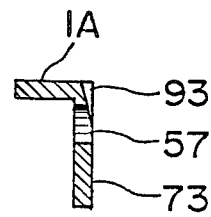
FIG. 40 is a partial cross sectional view taken along the line VIII—VIII in FIG. 39.

Then the rotatable lid member 3 is slightly bent and the second pivotal pin 56 is inserted into another supporting hole 57 formed in the side wall 74 of the top section 1A. For facilitating smooth insertion of the second thread pin 56, the rotatable lid member 3 may be made of acryl-nitryl synthetic resin such as a copolymer of acryl nitryl styrene and copolymer resin of acryl nitryl-butadiene-styrene to have flexibility, and as shown in FIGS. 36, 39 and 40, a guide groove 93 may be provided from the end of the side wall 73 of the top section 1A toward the supporting hole 57. The guide groove 93 is, as shown in FIG. 39, inclined at the bottom so that the side near the end of the side wall 73 of the top section 1A is made deeper than the side near the supporting hole 57.

The second pivotal pin 56 is engaged in the supporting hole 57 so that the downwardly extending hook-shaped member 60 formed in the rotatable lid member 3 is inserted into the interior of the cartridge case through the hole 61 formed in the top section 1A. Thus, the rotatable lid member 3 can be rotatably mounted on the top section 1A and is biased to the closed position by the restoring force of the coiled spring 65. On the other hand, the free end of the hook-shaped member 60 thus inserted in the interior of the top section 1A is engaged with the rear end of the stop member 51 thereby causing the lid member 3 to be locked in the closed position. Thus, assembling of the magnetic recording tape cartridge is completed.

In the vicinity of the holes 92A and 92B, there are respectively formed receiving grooves 94 for securely retaining the coiled spring 65 extending from the rotatable lid member 3 over the top section 1A in the predetermined position so that it does not project beyond the upper surfaces of the rotatable lid member 3 and the top section 1A. Since no projection member is formed on the outer peripheries of the pivotal pins 55 and 56, the pins 55 and 56 may be inserted into the supporting holes 57 after the top and bottom sections 1A and 1B are assembled each other in the aforementioned manner.

When the magnetic recording tape cartridge is not in use, the magnetic recording tape 5 is somewhat raised at the substantially central portion being exposed in the front surface of the cartridge case by the raised portion 44 of the bottom section 1B so that the magnetic tape 5 is prevented from being loosened as shown in FIG. 3. When the magnetic recording tape cartridge is set in the recording/reproducing apparatus, the reels 6 are somewhat raised upwardly against the elasticity of the spring plate 84 by the drive shaft inserted into the concavity 40 of the reel 6, and the magnetic recording tape 5 is moved upwardly following thereto, so that the bottom edge of the magnetic recording tape 5 is separated from the raised portion 44. The magnetic recording tape 5 tends to widely move vertically especially when running along the front surface of the cartridge case, though, provision of the raised portion 44 controls the vertical movement of the magnetic recording tape 5 to facilitate stable running of the tape and prevent the ends of the magnetic recording tape from being damaged by the vertical vibration.

What is claimed is:

1. A magnetic recording tape cartridge comprising:
   (a) a bottom section and a top section assembled together by a fastening means so as to provide a cartridge case having a front wall, a bottom wall and a tape chamber with a plurality of openings formed in said front wall,
   (b) at least one tape reel accommodated in said tape chamber, rotatably mounted relative to a drive shaft insertion hole defined in the bottom wall of said bottom section of the cartridge case,
   (c) a magnetic recording tape wound around said reel, the intermediate portion of said recording tape being stretched running along a predetermined path defined by said front wall,
   (d) a lid member hingedly mounted on the cartridge case and having a generally straight lid plate disposed generally parallely with the front wall to close said openings of the front wall to protect the magnetic recording tape situated along the front wall, said lid member being rotated in a direction away from said front wall when used, said lid plate being provided with a pair of openings at the lower end portion in the both lateral end portions of the cartridge case so as to expose the corresponding portions of the front wall of the cartridge case for abutting onto a pair of positioning members provided in a cartridge mounting holder of a tape player,
   (e) a pair of through-hole defined in the bottom wall of the bottom section for receiving at least one standard pin of the tape player with the diameter of the hole being larger than the diameter of the standard pin to loosely receive the standard pin in the hole, and
   (f) means for positioning the cartridge case on a predetermined position of the tape player, having a movable member resiliently biassed by means of a resilient member to oppose the hole so as to resiliently engage with the standard pin inserted inside the cartridge case through the hole when the cartridge case is mounted on the tape player thereby clamping the standard pin between the movable member and a portion of the wall of the hole to cause the cartridge case to be detouchably secured in position.

2. A magnetic recording tape cartridge according to claim 1, wherein said positioning means are located respectively corresponding to a pair of standard pin insertion holes defined at the respective corners of the rear side of the cartridge case.

3. A magnetic recording tape cartridge according to claim 1, wherein said movable member of the positioning means is formed by a lever with one end pivoted by an axis situated nearby the hole and with the intermediate portion of the lever bent to assure engagement with the standard pin.

4. A magnetic recording tape cartridge according to claim 3, wherein the lever of the positioning member has a free end detouchably engaging with the peripheral edge of the tape reel when the cartridge case is removed from the tape player so as to prevent rotation of the tape reel.

* * * * *